United States Patent [19]

Tahara

[11] Patent Number: 5,425,025

[45] Date of Patent: Jun. 13, 1995

[54] COMMUNICATION PROTOCOL SYSTEM

[75] Inventor: Tadayuki Tahara, Kawasaki, Japan

[73] Assignee: Fujitsu Limited, Kawasaki, Japan

[21] Appl. No.: 203,767

[22] Filed: Mar. 1, 1994

Related U.S. Application Data

[63] Continuation of Ser. No. 785,068, Oct. 30, 1991, abandoned.

[30] Foreign Application Priority Data

Oct. 30, 1990 [JP] Japan .................. 2-293087

[51] Int. Cl.6 .................. H04J 3/12; H04J 3/14
[52] U.S. Cl. .................. 370/60; 370/94.1; 370/99
[58] Field of Search .......... 370/60, 94.1, 99; 371/32

[56] References Cited

U.S. PATENT DOCUMENTS

| | | | |
|---|---|---|---|
| 4,617,657 | 11/1986 | Drynan et al. | 370/60 |
| 4,970,714 | 11/1990 | Chen et al. | 370/94.1 X |
| 4,975,952 | 12/1990 | Mabey et al. | 370/60 X |
| 5,014,265 | 5/1991 | Hahne et al. | 370/60 |
| 5,163,046 | 11/1992 | Hahne et al. | 370/79 |
| 5,168,497 | 12/1992 | Ozaki et al. | 370/94.1 |

Primary Examiner—Douglas W. Olms
Assistant Examiner—Russell W. Blum
Attorney, Agent, or Firm—Staas & Halsey

[57] ABSTRACT

A communication protocol used in a communication utilizing a window system, wherein a transmitting window number, a receiving window number, a transmitting sequence number and a receiving sequence number are provided as items in a message. The transmitting side and receiving side respectively count up the number of times of transmission and reception of messages transmitted and received and also give or provide the counted value to or in a message as the transmitting window number or receiving window number. In addition, transmitting window number is counted up when a number of messages transmitted or received has exceeded the window width, and thereby a number of times of transmission and reception of messages is controlled in units of the window number.

4 Claims, 14 Drawing Sheets

COMMUNICATION PROTOCOL SYSTEM

This application is a continuation of application Ser. No. 07/785,068, filed Oct. 30, 1991, now abandoned.

BACKGROUND OF THE INVENTION

1. Field of the Invention

The present invention relates to a communication protocol system used during a communication by a personal computer utilizing an ordinary communication line for public use such as a telephone line.

2. Description of the Prior Art

Currently, users who communicate using a computer with an outside source are remarkably increasing.

Moreover, in proportion to the increase of users who communicate using a personal computer, the quantity of text data such as messages and binary data such as programs to be transmitted and received is also increasing tremendously. For this reason, high efficiency and high reliability transmission are essential for such communication by personal computer.

Transmission control procedures which are generally used for the conventional communication by personal computer include a "non-procedure" used for text data (so-called character data displayed on the screen) and "XMODEM" for binary data not displayed on the screen such as a program execution file.

The "non-procedure" does not substantially provide problems in the transmission efficiency but in reliability.

The latter "XMODEM" does not provide problems in the reliability but in the transmission efficiency due to the transmission format requiring an acknowledgement upon receipt. For instance a packet data is transmitted and received, for example, in sizes unit of 128 bytes, and such a packet data is checked, for example, by a "check sum (csum)" or the receiving side for every packet, and then a check of the transmission by ACK/NAK is carried out, namely "ACK" is returned, when no error is detected but "NAK" is returned when an error is detected. While "XMODE" is a highly reliable method of transmitting data, "XMODE" is not as efficient as the other methods.

SUMMARY OF THE INVENTION

It is therefore an object of the present invention to provide a communication protocol which accomplishes communication processing by a personal computer terminal and ensures high efficiency transmission and high reliability transmission without using particular hardware such as a communication controller in the communication by personal computer utilizing an ordinary public line telephone network.

To attain the above object, a window system communication is used where a number of messages predetermined between a transmitting side and a receiving side for executing data communication via a packet switching network are defined by the window width, the transmitting side transmits continuously a plurality of messages for the window width and the receiving side returns an answer for acknowledgment of reception to the transmitting side when the plurality of messages for the window width are received. The communication protocol of the present invention comprises:

- a transmitting window number, a receiving window number, a transmitting sequence number and a receiving sequence number provided as the items to be assigned to particular regions of a message;
- a number of times of transmission or reception of messages is counted respectively in the transmitting and receiving side and such counted value is provided for a message as the transmitting window or receiving window numbers;
- the transmitting window number is counted up or incremented when a number of messages transmitted or received has exceeded the window width; and
- a number of times of transmission and reception is controlled in units of the window number.

DESCRIPTION OF THE PREFERRED EMBODIMENT

A preferred embodiment of the present invention will be explained in detail with reference to the accompanying drawings.

Figure 1:
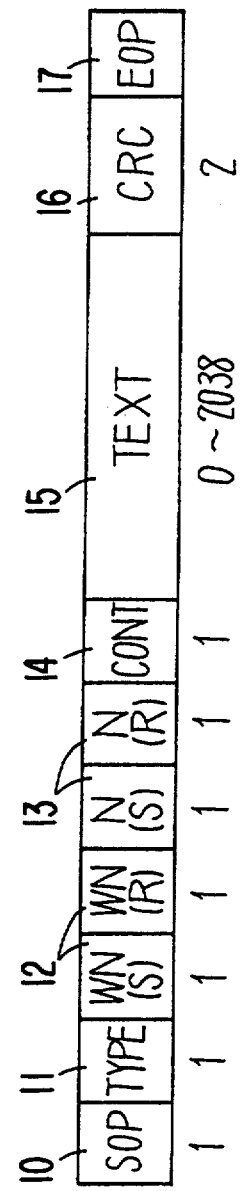
FIG. 1 shows a message format in an embodiment of the present invention.
Figure 2:
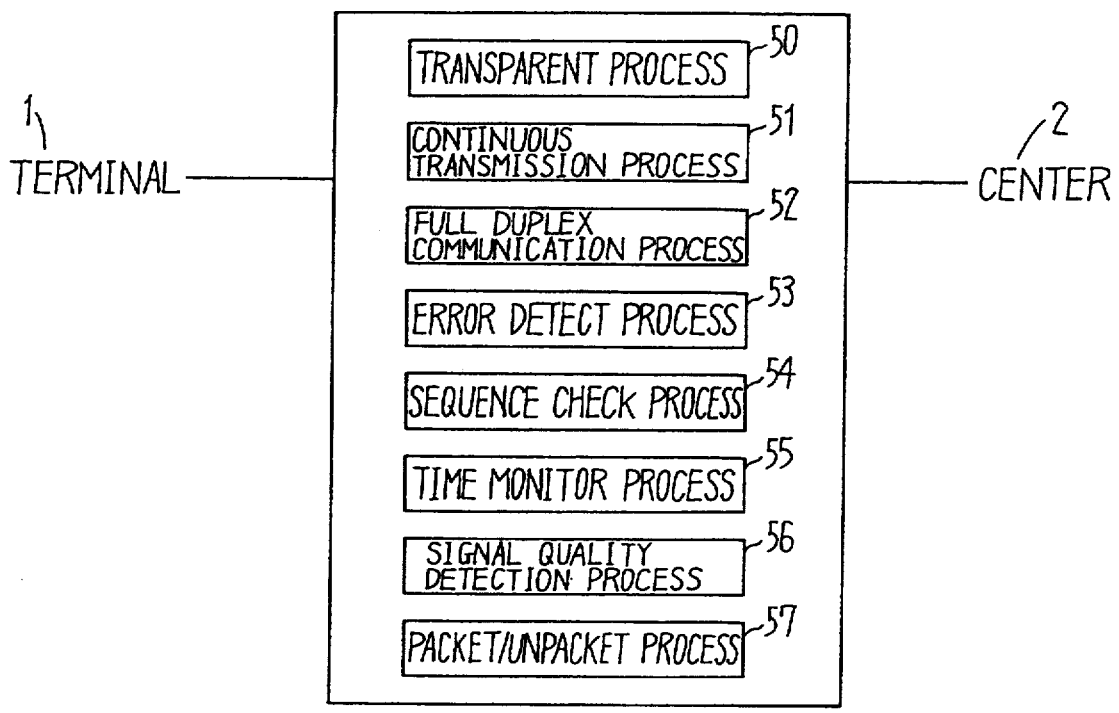
FIG. 2 shows software in a terminal and a center in the embodiment of the present invention.

In the present invention, a message having a data format as shown in FIG. 1 is transmitted and received during a data communication between a terminal 1 and a center 2. As shown in FIG. 2, the terminal 1 and center 2 respectively have or share the software for the text data and binary data transparent process 50, continuous transmission process for a plurality of messages 51;, full duplex communication process 52 error detect process 53, sequence check 54, timer monitor 55, signal quality detection process 56 and packet/unpacket process 57 when a message length becomes longer than the specified packet length.

Operation of personal computer communication utilizing a communication protocol of the present invention will be explained hereunder.

Figure 3:
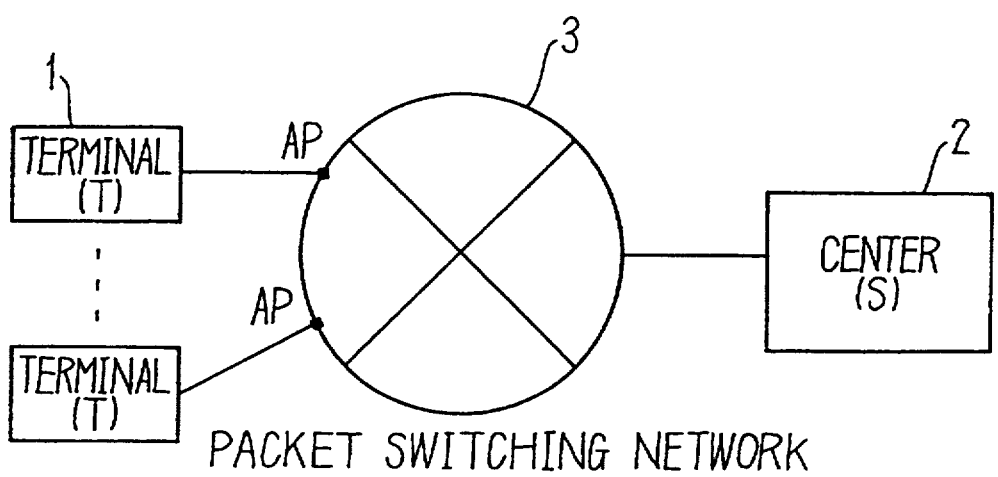
FIG. 3 shows personal computer communication network to which the present invention is applied.

First, when it is requested to make a personal computer communication with a communication protocol of the present invention between the terminal 1 and the center 2 in the network shown in FIG. 3, a message having the data format shown in FIG. 1, for example, in the variable length of 1~2048 bytes is used. Highly efficient and reliable data transmission can be realized without using particular hardware, such as a communication controller as in the case of another form of communication, for example, in the communication between large scale computers.

The communication protocol of the present invention will be explained hereunder.

First, the data format of the message used by the communication protocol of the present invention is explained with reference to FIG. 1.

SOP (Start Of Packet) 10 indicates the starting region of a message. As the transmission code, 0×7F (hexadecimal number, omitted hereinafter) is used.

TYPE 11 indicates a kind of information of TEXT portion and necessity of response.

| TYPE | Class of Information | Function |
| --- | --- | --- |
| 'I' | Data | Used for ordinary data |
| 'P' | Data | Used for maturing to a number of windows to request a response |
| 'R' | Request response | Requesting a response to check for normal operation |
| 'A' | Notify condition | Notifying a normal condition for a request response |
| 'N' | Request retransmission | Used for requesting retransmission of a packet |

WN (Window Number) 12 indicates a serial number when a plurality of messages (window width) are continuously transmitted and received. For example, in a personal computer communication, when packet switching equipment exists between a terminal 1 and a center 2 and messages stay longer or are delayed, in the packet switching network and a contradiction or error may occur if a number of messages exceeds the window width. The window number WN is used for preventing such a contradiction and indicates a transmitting and receiving window number. This number may be cyclicly counted from 0 to 127 and then return to 0 after exceeding 127. The renewal procedure for this window number will be explained with reference to FIG. 4 and FIG. 5.

Figure 6:
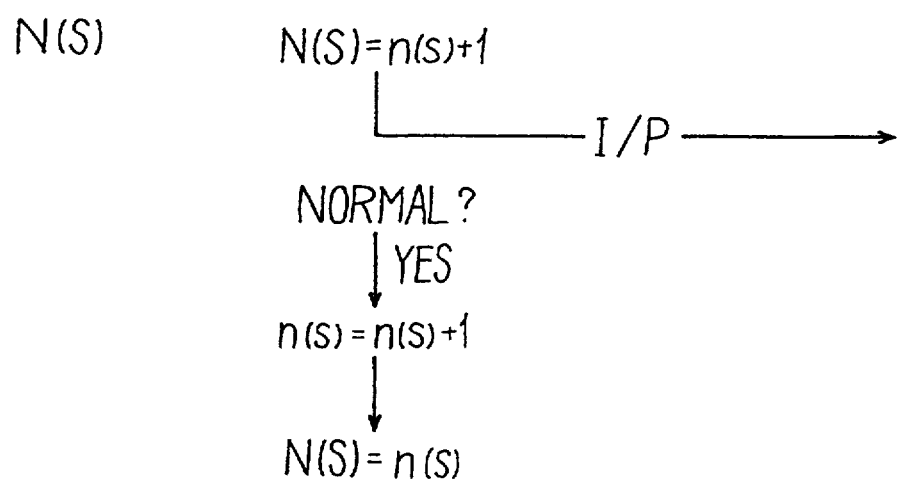
FIG. 6 shows a transmitting sequence number renewal processing in the embodiment of the present invention.
Figure 7:
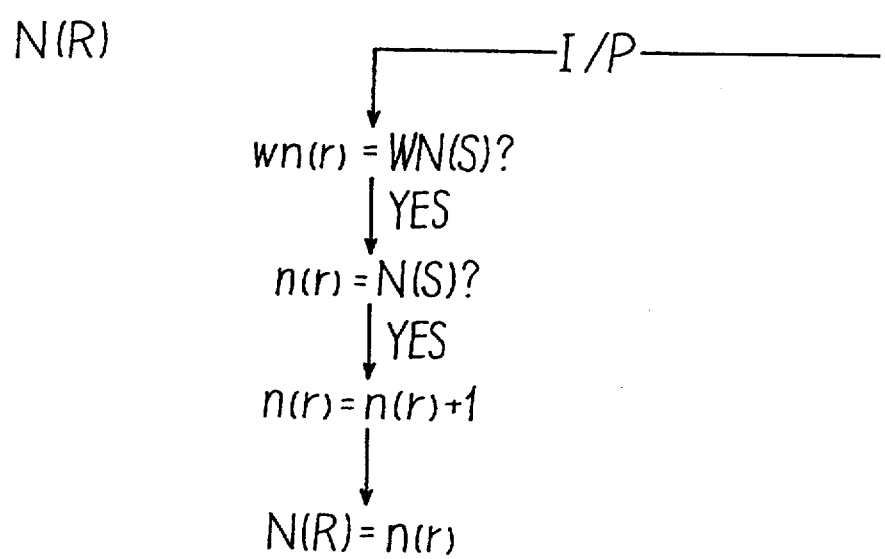
FIG. 7 shows a receiving window number renewal processing in the embodiment of the present invention.

In these figures, small letters indicate internal counters not illustrated but provided in terminal 1 or center 2, while capital letters indicate window numbers shown in a packet. This rule is also applied to the sequence number described later which is shown in FIG. 6 and FIG. 7.

WN (S) indicates a transmitting window number. When the answer (A/I/P packet) for the P packet is received, a transmitting window number is compared with the internal transmitting window number counter, namely to determine whether wn(s)+1=WN(R) or not. When a match occurs, a value of wn(s) is set to or loaded into the WN(S) of the packet to be transmitted thereafter by adding 1 to wn(s). {Refer to FIG. 4}

WN (R) indicates a receiving window number. When the P packet is received from a distant party, a receiving window number is compared with the internal receiving window number counter, namely whether wn(r)=WN checked (S). When a match occurs, the receiving window number is initialized to the internal receiving sequence number counter n(r)=0 by wn(r)=wn(r)+1. {Refer to FIG. 5}

N (Number) 13 in FIG. 1 indicates a sequence number of a packet. This number is used for preventing the less of a packet or double reception. This number is cyclicly used from 0 to 127, returning to 0 when exceeding 127.

N(S) indicates a sequence number of a packet to be transmitted next. Upon each normal transmission of an information packet (information class is I or P), the internal transmitting sequence counter n(s) adds 1. Thereafter, n(s) is set to or loaded into the transmitting sequence number N(S). {Refer to FIG. 6}

N(R) indicates a sequence number of an information packet (I/P packet) to be received next. When the information packet is received normally, namely when a value of the current receiving window number counter wn(r) matches the transmitting window number WN(S) of the transmitted packet, and a value of the internal receiving sequence counter n(r) matches the sequence number N(S) of the transmited packet, 1 is added to the receiving sequence counter n(r). Thereafter, n(r) is set to or loaded into the receiving sequence number N(R).

CONT (CONTinue) 14 indicates whether a message is divided into packets or not. It is used in the form of PACKET/UNPACKET respectively in the transmitting side and receiving side.

Class of information of "CONT" is indicted hereunder.

| CONT | Class of Information | Function |
| --- | --- | --- |
| 'O' | ONLY | Used when a message is completely included within one packet |
| 'F' | FIRST | Used in the leading packet when a message is not completely included within one packet |
| 'M' | MIDDLE | Used in a middle packet when a message is not completely included within one packet |
| 'L' | LAST | Used in the last packet when a message is not included within one packet |

TEXT 15 indicates the text that messages are stored and transmitted in the message. The length of the TEXT is determined or predetermined to be under 2038, for example, through communication between a terminal and a center.

CRC (Cyclic Redundancy Check) 16 indicates a CRC value in the range from SOP 10 to TEXT 15.

EOP (End of Packet) 17 indicates the end of a message. A carriage return code (CR) (0×0D) is used.

Various processings for transmitting and receiving messages in the data format explained above are explained hereunder.

(1) Transparent process:

The transparent process in this embodiment will be explained in accordance with the data format of FIG. 1.

① Transparent process object code:
0×7F (hexadecimal number 7F; omitted hereunder) as SOP 10
0×0D as EOP 17
0×10 as DLE (transmission control expansion code)
DC1 (0×11), DC3 (0×13) as the flow control codes {for example, control code indicating whether the transmitting and receiving buffers of packet switching network are busy (DC1) or idle (DC3)}

② TEXT 15, CRC 16 regions
Transmitting side

In the case of transparent object data, DLE (0×10) is added, logical sum of real data and 0×80 is taken and a result is transmitted as the data.

③ WN 12, N 13 regions

Transmitting side

It is different from the transparent object code by setting a logical sum of 0×80 to the values of (S), (R).

Receiving side

A logical product of the values of (S), (R) and 0×7F is used as a real data.

(2) Continuous transmission:

In view of improving transmission efficiency, the present invention realizes continuous transmission and reception without confirming transmission. Number of such continuous transmission and reception operations for a window width can be held or stored in the terminal and center. For example, this number can be set freely under 127.

If the window number exceeds 127 during transmission and reception of data, it is necessary to request response using the P packet (described later) in order to request a check of the transmission to the receiving side.

Figure 8:
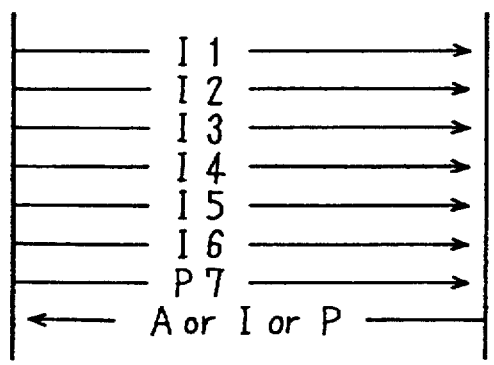
FIG. 8 shows continuous transmission and reception in the embodiment of the present invention.

Moreover, the side wherein the P packet is received either returns the I or P packet when the sequence number is matched and there exists the data to be transmitted or returns the response with the A packet when there is no data to be transmitted. The profile or sequence of such operation is indicated in FIG. 8, using an example where the window width is set to 7.

Figure 9:
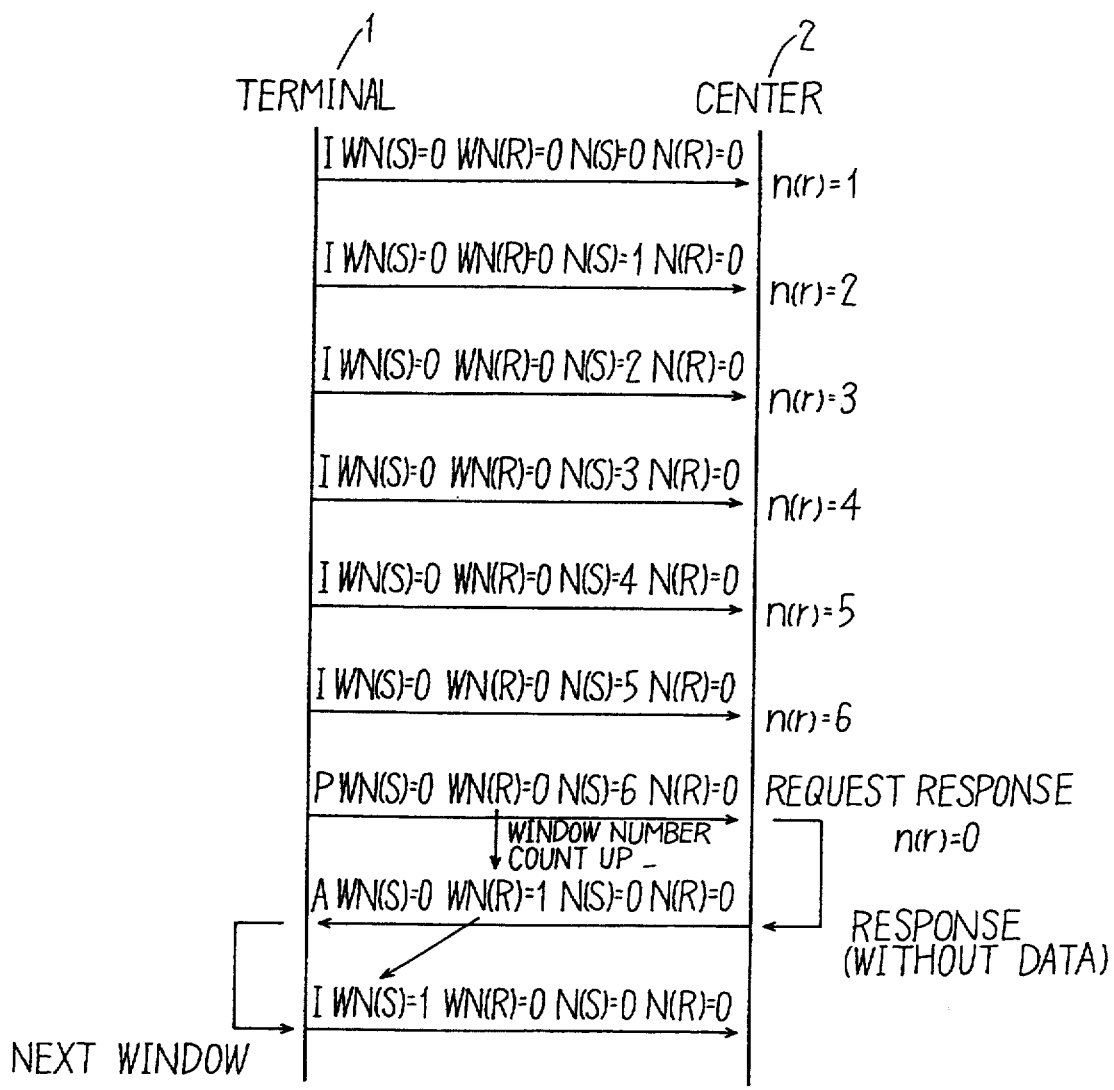
FIG. 9 shows an example of practical communication flow in the embodiment of the present invention.

FIG. 9 shows an example of the practical communication flow, for instance, the communication flow during transmission to the center 2 from the terminal 1.

Each time a message is transmitted, an internal transmitting sequence counter n(s) (not illustrated) is counted up in the terminal 1 in the transmitting side {refer to FIG. 6}. In the center 2 of receiving side, a value of the internal receiving sequence counter n(r) (not illustrated) is checked to determine whether it matches the transmitting sequence number N(S) of the received message, upon each reception of a message. When these a match occurs, the reception is considered normal and a value of the receiving sequence counter n(r) is counted up or incremented. {Refer to FIG. 7}

As a result of the above processing, the receiving sequence counter n(r) in the center 2 indicates '0' to '6' as the transmitting sequence number N(S) changes from '0' to '6'. {Refer to FIG. 6}

During this time, since no message is transmitted to the terminal 1 from the center 2, the receiving sequence number N(R) in the message transmitted from the terminal 1 remains as 0.

In this example, the window width is '7' and the last message at the end of continuous transmission of seven messages is transmitted as the "TYPE" class "P" (P packet). It is also notified to the center 2 that the window width is matured or exceeded 127, requesting the response as explained above.

In this situation, in the center 2, the internal receiving window number counter is checked to determine whether it is equal to the transmitting window number, wn(r)=WN(S). When these two variable are matched or equaled, 1 is added to wn(r), and the internal receiving sequence counter n(r) is initialized to 0.

Thereafter, it is returned in the A packet that the operation is normal for the request of a response (however, there is no data to be transferred). Therefore, since the receiving sequence number N(R)=0 and the seven messages are received normally, 1 is added to the receiving window number WN(R) to set the content of wn(r) and send a response.

Figure 4:
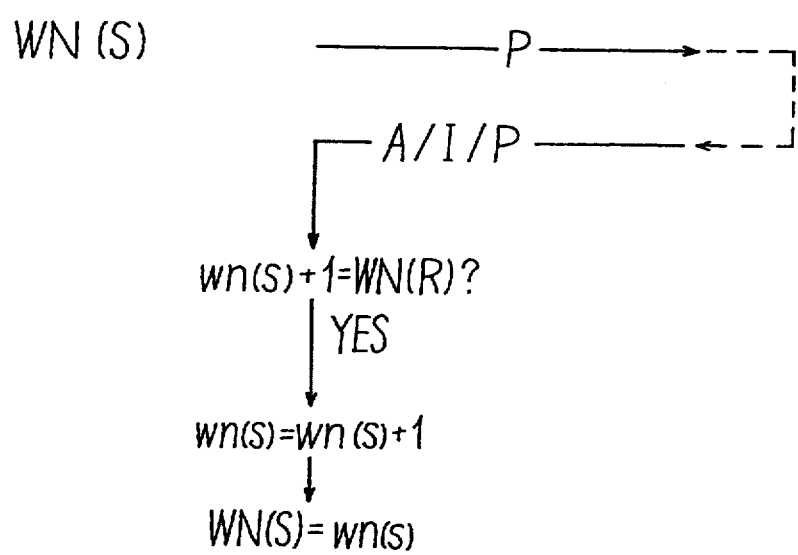
FIG. 4 shows a transmitting window number renewal processing in the embodiment of the present invention.
Figure 5:
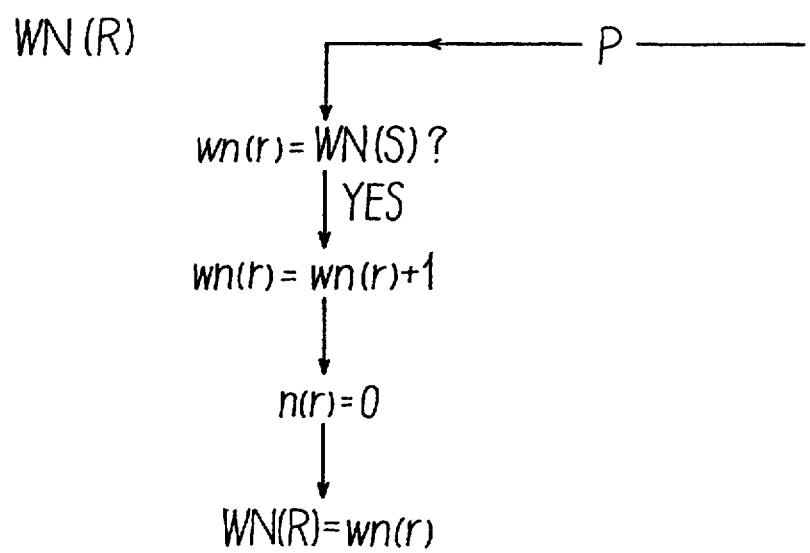
FIG. 5 shows a receiving window number renewal processing in the embodiment of the present invention.

Upon reception of the A packet as the response, the terminal 1 checks, as shown in FIG. 4, whether the internal transmitting window number counter wn(s)+1 is equal to the receiving window number WN(R), that is whether (wn(s)+1=WN(R)). When a match occurs, 1 is added to the wn(s), a value of wn(s) is set as or loaded into the transmitting window number WN(S), and novel continuous transmission is started by the I packet.

Figure 10:
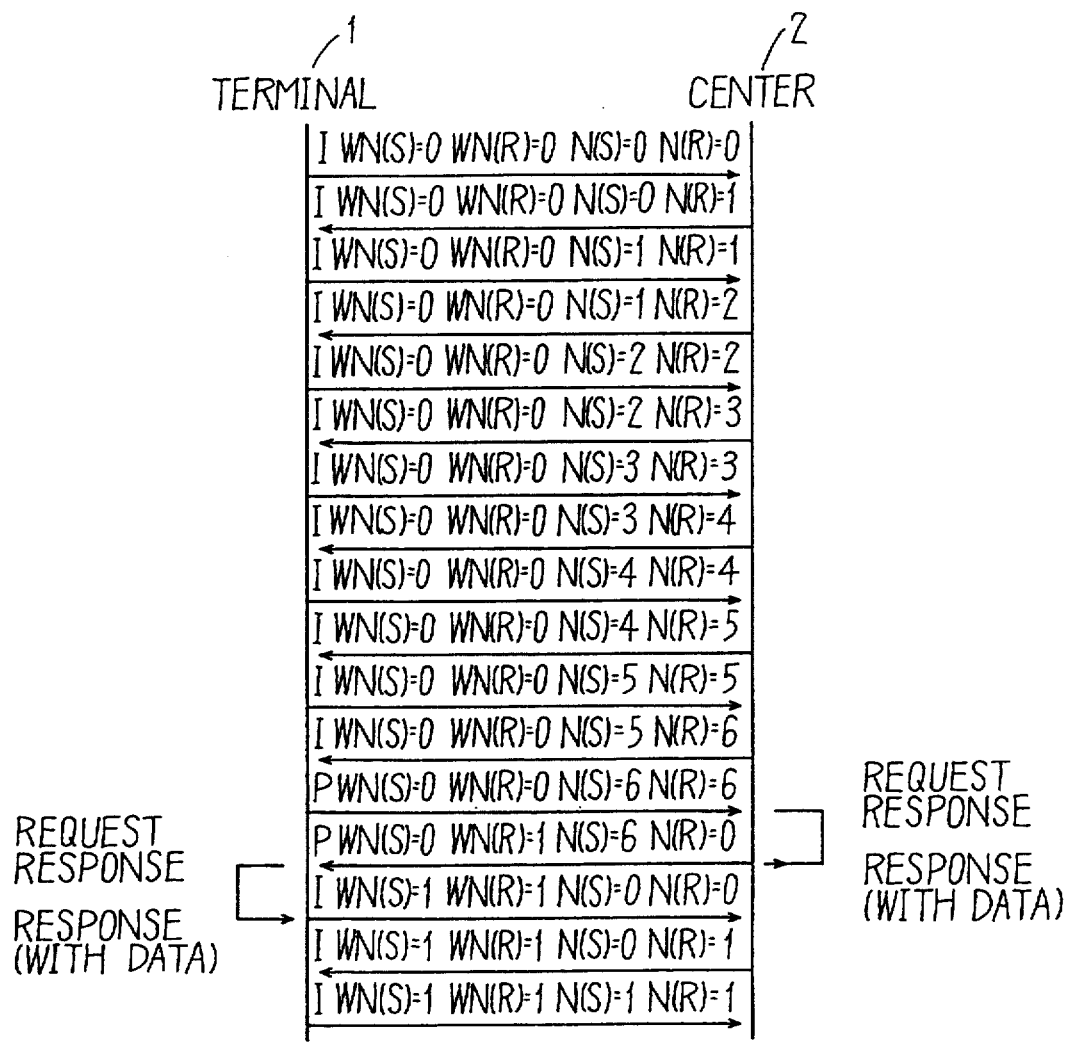
FIG. 10 shows an example of a full duplex communication flow in the embodiment of the present invention.

FIG. 10 shows an example where data communications are executed by both terminal 1 and center 2 (so-called full duplex communication) using the same procedures as FIG. 9.

When terminal 1 transmits a message notifying that the window number becomes equal to 7 with the P packet requesting a response, the center 2 returns a response with the P packet, in place of the A packet, since it has the data to be transmitted in succession and requests a response. At this time, the receiving window number WN(R) is changed to 1 from 0 as explained above.

The terminal 1 returns a response corresponding to the P packet from the center 2 since it has the data to be transmitted in succession and also starts the next continuous transmission.

As explained above, the messages can be transmitted and received continuously or any number of messages stored in the terminal 1 and center 2, using the window number WN.

(3) Error detection

In order to detect an error on the transmission line, the receiving packet is checked, in the present invention, for example, by the CRC-16 system. When a CRC error is detected, such a packet is lost.

(4) Sequence check:

Since the packets to be transmitted or received are all given the sequence numbers as explained above in the present invention, missing packets and double reception of packets can always be checked in the terminal 1 and center 2.

When a missing packet is detected or checked (unmatching of sequence), retransmission from the packet next expressions to the packet received normally is requested. When a double reception is generated, received data is lost.

Figure 11:
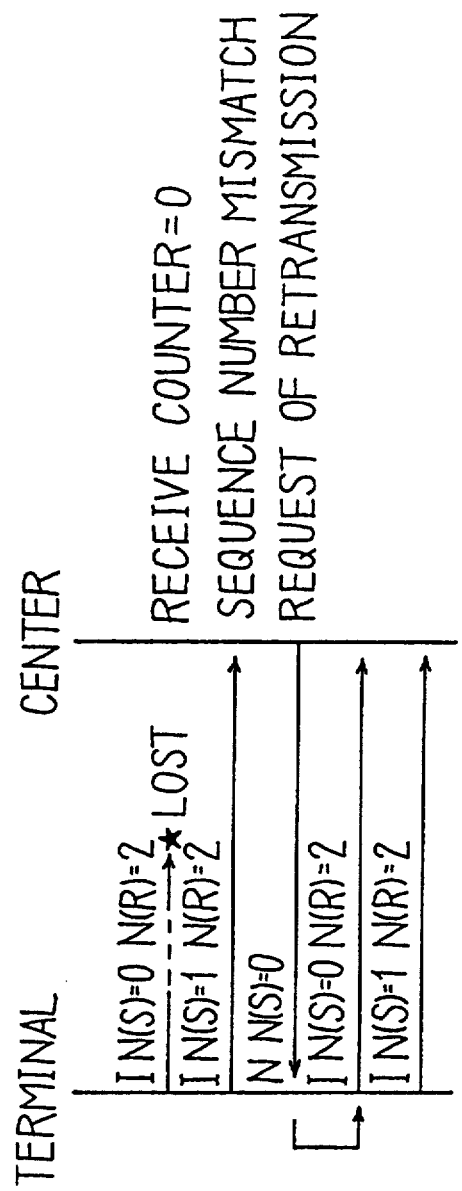
FIG. 11 shows an example of a sequence check in the embodiment of the present invention.

FIG. 11 shows a communication flow in a such process. In this example, the received data is lost in the first I packet from the terminal 1.

In this case, since the receiving counter of the center 2 of the receiving side remains as '0' in this example, when the next I packet is received from the terminal 1, mismatching is detected for N(S)=1 in the transmission sequence.

Therefore, the center 2 transmits the N packet for instructing a retransmission request, using a value of the receiving counter.

The terminal 1 starts retransmission from the sequence number '0' for N(R)=0 in the receiving sequence of the received N packet.

(5) Time monitor:

The present invention provides a response monitor timer and a silent condition monitor timer for executing the following processes respectively.

Figure 12:
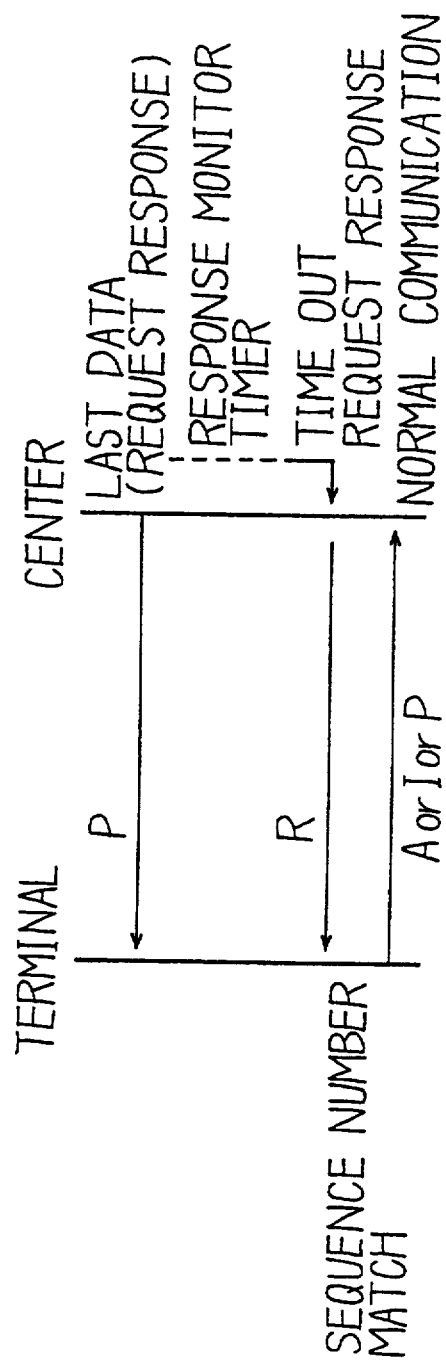
FIG. 12 shows processing of an answer monitor timer in the embodiment of the present invention.

1) Response monitor timer:

When the response packet is not received within a predetermined time (determined by terminal and center) for a packet which requires a response (P or R packet), the R packet which requests a response is transmitted, requesting a response. In case there is data to be transmitted to the terminal or center where the response request is received, the I or P packet is used. In case there is no data to be transmitted, the A packet is transmitted for notifying the condition. The operation profile is shown in FIG. 12. {Refer to a communication flow shown in FIG. 9, FIG. 10.}

2) Silent condition monitor timer

Figure 13:
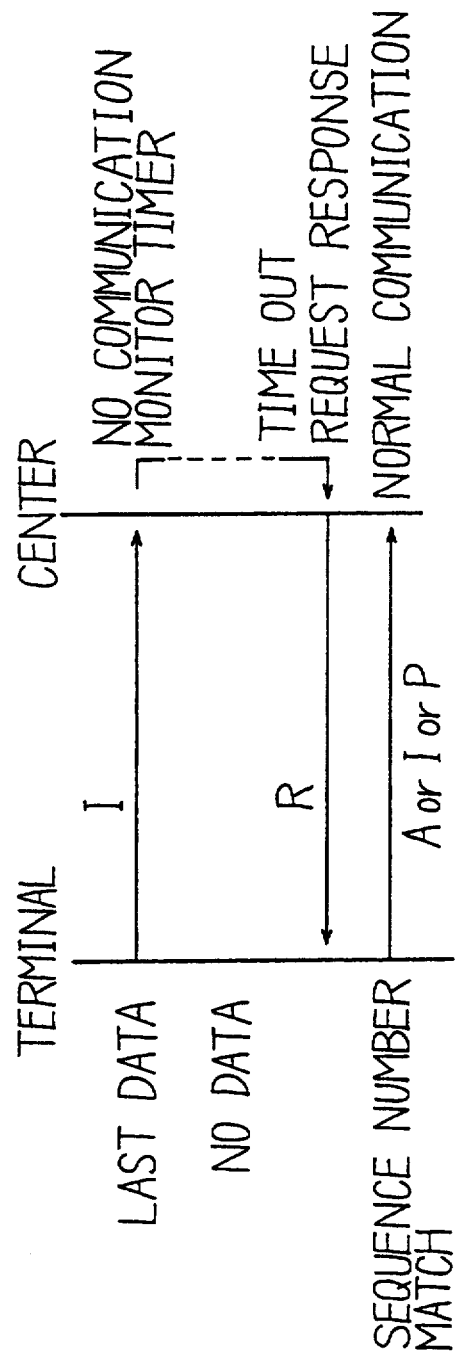
FIG. 13 shows processing of a silent condition monitor timer in the embodiment of the present invention.

When transmission and reception a packet are not executed for a certain period, the R packet is transmitted to request a response in order to confirm the normal communication is being executed. In the terminal or center from in which the response request is received, the I or P packet is used when there is data to be transmitted, or the P packet is transmitted for notifying the condition when there is no data to be transmitted. FIG. 13 shows a profile of such operation.

(6) Signal quality detection:

When the following conditions are satisfied, signal quality is detected as bad and the transmission line is forced to be cut or not used.

1) When N packet is received continuously for $n_1$ times;
2) A number of times of retry by the R packet reaches $n_2$;

The values of $n_1$, $n_2$ are decided between the terminal and center.

(7) Packet process:

When the transparent process explained in the paragraph (1) explained above is executed, the DLE code is added if the transparent process object code is included in the message. Therefore, a packet length determined by the terminal and center sometimes becomes longer.

In this case, a message is divided into a plurality of packets for transmission in order to set the packet length within the specified length. In this case, the transmitting side sets the code "F" indicating the heading region to "CONT" region of the first packet and also sets the code "L" indicating the last packet to the "CONT" region of the last packet. On the other hand, the receiving side decides whether a plurality of packets are transmitted or not from the CONT region in the packet and assembles a message. The receiving side also assembles the original message based on the classes "F", "M", "L" of the code designated in the code "CONT" of the received packet.

Figure 14:
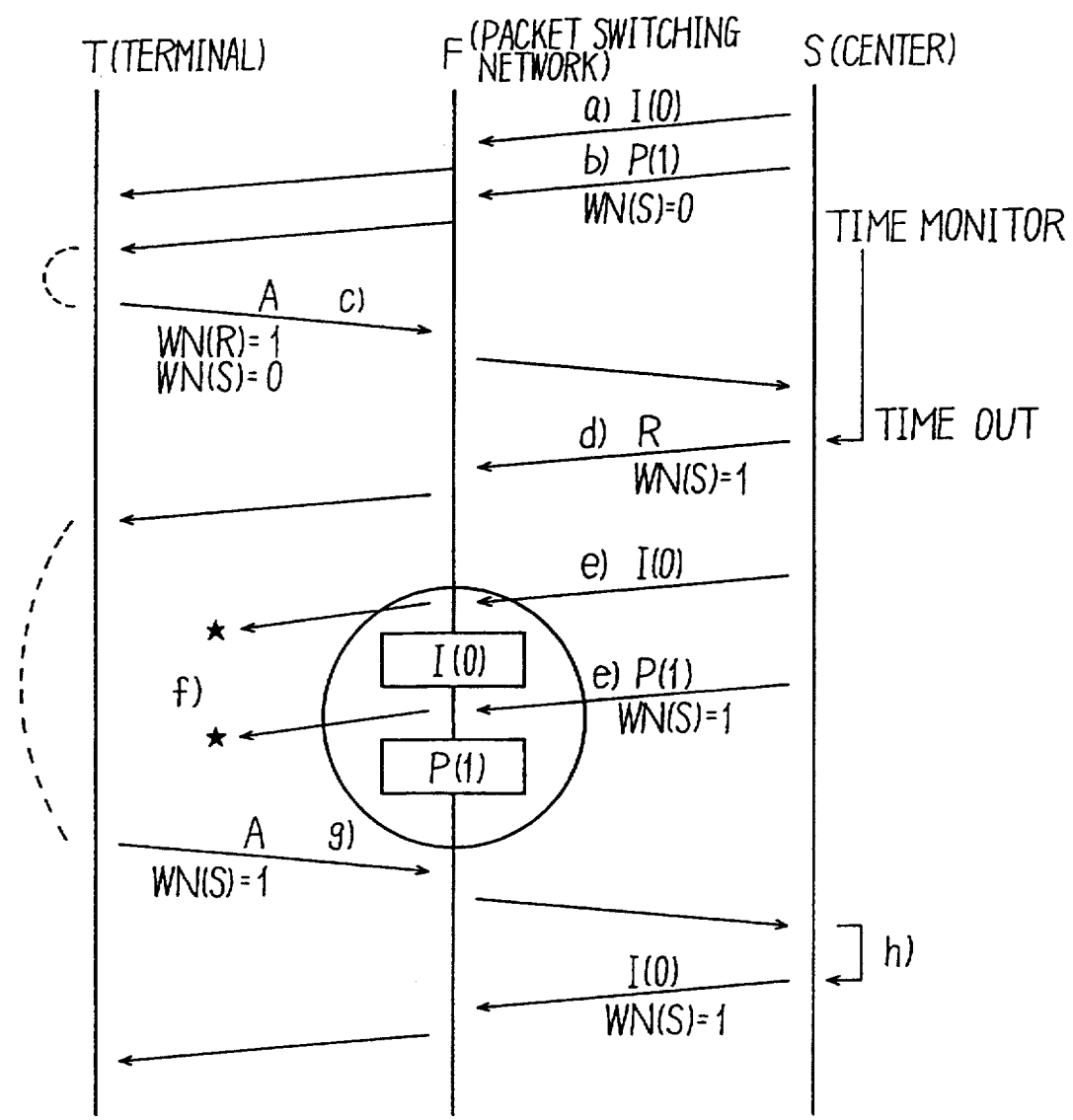
FIG. 14 shows a role of a window number in the embodiment of the present invention.

(8) Process when a message cannot be transmitted due to a fault occurring in the packet exchange side:

The roles of window numbers WN(S), WN(R) which characterize the communication protocol of the present invention will be explained with reference to FIG. 14.

Here, the terminal 1 is indicated by T, a packet switching network by F and a center 2 by S. The window width is set to '2' for convenience of explanation and a numeral in the parentheses of the figure indicates a transmitting sequence number N(S).

a) The data "I(0)" is transmitted from S.

b) The next data is transmitted from S. In this case, since the width of windows is '2' as explained above, the data becomes "P(1)".

c) After the process for the data of a), b) is executed, T transmits the "A packet" for the response to the P packet of b). At this time, WN(R) of A packet is 1 and WN(S) is 0.

d) After the A packet is received by S from T, the communication protocol of the present invention changes the window number WN(S) as explained above. Moreover, since transmitting data is no longer transmitted from S, the silent condition monitor timer explained above operates and the "R packet" is transmitted to confirm the normal operation. Therefore, WN(S) of the "R packet" is equal to 1. (WN(S)=1)

e) Thereafter, since two pieces of transmitting data are generated in S, I(0) and P(1) are respectively transmitted in the same manner by S and stay longer within the packet switching network F.

f) It is assumed that the data transmitted in the step e) from S cannot be transmitted due to the failure of transmission in the packet switching network.

g) T transmits the "A packet" as a response to the R packet (a packet for requesting a response as explained above) received in the step d). Therefore, WN(S) of the "A packet" becomes equal to 1. (WN(S)=1)

h) S interprets that the A packet received in the step g) is a response to the P packet transmitted in the step e), even when it is truely the response to the R packet in the step d) and perfectly loses the transmitting data I(0) and P(1) in the step e) and generates a contradiction when the I packet is newly transmitted.

Therefore, the present invention can recognize a message missed during above process by referring to the window numbers WN(S), WN(R).

Namely, S recognizes that the A packet is a response to the R packet transmitted thereby in the step d) by referring to the transmitting window number WN(S) (=1) of the A packet transmitted in the step g) and decides that two packets transmitted in the step e) are not yet received. Moreover, S can eliminate the contradiction mentioned above by retransmitting the next I packet as a message of WN(S)=1 by referring to WN(S) of the "A packet".

Employment of the system for independently controlling the window number and sequence number in the present invention is also based on the following reasons.

In the window system communication, it must be recognized that a number of messages received has reached the window width in case the receiving side returns a response for acknowledgment to the transmitting side. However, it is necessary in the system to give or provide only the sequence number to a message to obtain the partition by dividing the sequence number with the window width.

Moreover, for example, when the sequence number storing region has the length of one byte, a total of 128 messages from number 0 to number 127 can be recognized but when the window width is set to 6, a remainder 2 is generated when 128 is divided by 6. In this case, the sequence number is cleared to 0 in the course of the continuous transmission, for example, from number 126 and thereby the first message is also transmitted.

Accordingly, the messages from number 2 is transmitted in the next window and partitioning position of the window is different in the first and second cycles.

As explained above, recognition of the partition of window also requires consideration of the remainder depending on the window width, in addition to the division processing. Since these processings give a large share or load on the software, it is undesirable to use such a system for personal computers.

According to the present invention, since the window number and sequence number are independently controlled as explained above, particular arithmetic processes are not required in the transmitting and receiving sides. As a result, the share of or burden on the software can be alleviated, resulting in realization of high speed communication.

We claim:

1. In a window system communication where predetermined messages between a transmitting side and a receiving side used to execute data communication via a packet switching network are defined by a window width, the transmitting side transmits continuously a plurality of messages each having particular regions in the window width and the receiving side returns a response for acknowledgment of reception to the transmitting side when the plurality of messages of the window are received, a communication protocol method comprising the steps of:

(a) providing a transmitting window number, a receiving window number, a transmitting sequence number and a receiving sequence number as items in the particular regions of each of the plurality of messages;
   (b) counting a first number of times of transmission of the plurality of messages in the transmitting side to generate a transmitting sequence number;
   (c) counting a second number of times of reception of the plurality of messages in the receiving side to generate a receiving sequence number;
   (d) incrementing the transmitting window number when one of the transmitting and receiving sequence numbers has exceeded the window width; and
   (f) incrementing the receiving sequence number for each successful reception of the plurality of messages in the receiving side and including the receiving sequence number in the response;
   (e) controlling transmission and reception using the transmitting and receiving window numbers and the transmitting and receiving sequence numbers.

2. In a window system communication according to claim 1, wherein said step (e) further comprises the substep of transmitting a request for a response from the transmitting terminal to the receiving terminal when the number of continuous transmissions and receptions exceeds a predetermined sequence number.

3. A communication protocol method for use with transmitting and receiving sides, comprising the steps of:

(a) incrementing, in the transmitting side, an internal transmitting sequence value forming an incremented transmit sequence value each time a message is transmitted, the message including a transmitting sequence number which is assigned the incremented transmitting sequence value and a transmitting window number;
   (b) incrementing, in the receiving side, an internal receiving sequence value forming an incremented receiving sequence value when the internal receiving sequence value matches the transmitting sequence number;
   (c) assigning, in the receiving side, to a receiving sequence number the incremented internal receiving sequence value;
   (d) incrementing, in the receiving side, an internal receiving window number forming an incremented internal receiving window number, initializing the internal receiving sequence counter, and sending a response without data to the transmitting side having a receiving window number, indicating normal operation when the internal receiving window number matches the transmitting window number;
   (e) incrementing, in the transmitting side, an internal transmitting window number forming an incremented internal transmitting window number and assigning to the transmitting window number the incremented internal transmitting window number when the incremented internal transmitting window number matches the receiving window number received in the response; and
   (f) controlling transmission and reception using the transmitting and receiving window numbers and the transmitting and receiving sequence numbers.

4. An apparatus performing a communication protocol, comprising:

first incrementing means for incrementing an internal transmitting sequence value forming an incremented transmit sequence value each time a message is transmitted, the message including a transmitting sequence number which is assigned the incremented transmitting sequence value and a transmitting window number;
   second incrementing means for incrementing an internal receiving sequence value forming an incremented receiving sequence value each time the message is received when the internal receiving sequence value matches the transmitting sequence number;
   assigning means for assigning to a receiving sequence number the incremented internal receiving sequence value each time the message is received;
   third incrementing means for incrementing each time the message is received, an internal receiving window number forming an incremented internal receiving window number, initializing the internal receiving sequence counter, and sending a response without data to the transmitting side having a receiving window number assigned the incremented internal receiving window number, indicating normal operation when the internal receiving window number matches the transmitting window number;
   fourth incrementing means for incrementing, each time the response is received, an internal transmitting window number forming an incremented internal transmitting window number and assigning to the transmitting window number the incremented internal transmitting window number when the incremented internal transmitting window number matches the receiving window number received in the response; and
   control means for controlling transmission and reception using the transmitting and receiving window numbers and the transmitting and receiving sequence numbers.

* * * * *

UNITED STATES PATENT AND TRADEMARK OFFICE
CERTIFICATE OF CORRECTION

PATENT NO. : 5,425,025

DATED : June 13, 1995

INVENTOR(S) : Tahara

It is certified that error appears in the above-indentified patent and that said Letters Patent is hereby corrected as shown below:

Col. 1, line 27, "XMODEM" should be --"XMODEM" used--.

Col. 2, line 18, "shows personal" should be --shows a personal--.

Col. 5, line 28, "such operation" should be --such an operation--;

line 41, delete "these";

line 61, "variable" should be --variables--.

Col. 6, line 28, "or" should be --for--;

line 44, "expressions" should be --or previous--;

Col. 7, line 14, delete "in".

Signed and Sealed this

Twenty-eighth Day of November 1995

Attest:

BRUCE LEHMAN

Attesting Officer

Commissioner of Patents and Trademarks